United States Patent Office 3,842,068
Patented Oct. 15, 1974

3,842,068
8-EPI-ERYTHROMYCINS

John Soloman Tadanier, Chicago, and Jerry Roy Martin, Waukegan, Ill., assignors to Abbott Laboratories, North Chicago, Ill.
No Drawing. Filed June 15, 1972, Ser. No. 263,088
Int. Cl. C07c 47/18
U.S. Cl. 260—210 E                    4 Claims

ABSTRACT OF THE DISCLOSURE

Covers 8-epi-erythromycins which are useful as antibiotics.

DESCRIPTION OF THE INVENTION

This invention relates to 8-epi-erythromycins which are found to possess antibiotic activity.

Erythromycin is produced in two forms denoted A and B by cultivating a strain of Streptomyces erythrus in a suitable nutrient medium as is taught in U.S. 2,653,899, Bunch et al. The structure of erythromycin is represented by the following formula:

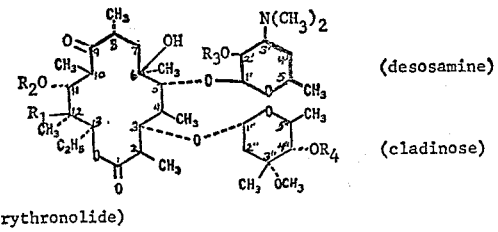

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is erythromycin A and erythromycin B.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

The starting materials in preparing the compounds of the invention may be 10,11-anhydroerythromycin B, 11,12-epoxyerythromycin A, erythromycin B, or 10,11-anhydroerythromycin A. The 10,11-anhydroerythromycins A and B and 11,12-epoxyerythromycin A are best prepared as outlined in co-pending commonly assigned applications, filed as of even date, bearing Ser. Nos. 263,051 and 263,056. After providing the starting materials there are essentially three methods of epimerization.

The first method of epimerization is an acid catalyzed epimerization. A preferred acid is aqueous acetic acid. The acetic acid content may vary from about 30 to about 60% by volume. In a typical solution a 1:1 volume ratio of acetic acid to water is used here.

In a second procedure if one is starting with 10,11-anhydro derivatives, one may use a base catalyzed reaction. Greatly preferred is 1,5-diazabicyclo[5.4.0]undecene-5 as a base in presence of catalytic amount of $CH_3SO_3H$, $C_2H_5SO_3H$, $\phi SO_3H$,

etc. Normally this reaction is run in the presence of an inert solvent such as xylene, methylene chloride or another inert hydrocarbon, toluene or benzene for a period of time from about 4 hours to about 50 hours and from room temperature to reflux temperature of the inert solvent.

The last mode of reaction here which is only applicable to the 11,12-epoxyerythromycin A starting material is epimerization by resort to glacial acetic acid.

The following examples illustrate preparation of the compounds of the invention.

EXAMPLE I

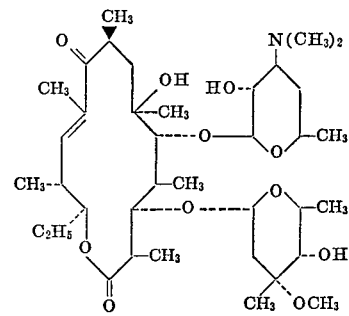

8-epi-10,11-Anhydroerythromycin B

A solution prepared from 5.3 g. of 10,11-anhydroerythromycin B, 80 ml. of glacial acetic acid, and 80 ml. of water was allowed to stand at room temperature for 49 hours. The resulting solution was added dropwise to a stirred suspension of 150 g. of solid $NaHCO_3$ in 800 ml. of water. The resulting suspension was extracted with 700 ml. of chloroform, and the chloroform solution was washed three times with 600 ml. portions of water and then dried over anhydrous magnesium sulfate. Evaporation of the chloroform solution left 5.2 g. of a white glass.

Partition column chromatography of 255 mg. of the above product gave 68 mg. of pure 8-epi-10,11-anhydroerythromycin B as a white glass, $[\alpha]_D^{26}$ —54°; $\lambda_{max}$. 230 nm. ($\epsilon$10,526); IR 3610 (shoulder), 3520–3400, 1723, 1664 cm.$^{-1}$; NMR: $\delta$6.35 ($C_{11}$—H), 3.29 ($OCH_3$), 2.29 ($NMe_2$), 1.83 (C—CH).

Analysis: Calcd. for $C_{37}H_{65}O_{11}N$ (percent): C, 63.49; H, 9.36; N, 2.00. Found (percent): C, 63.43; H, 9.56; N, 1.89.

EXAMPLE 2

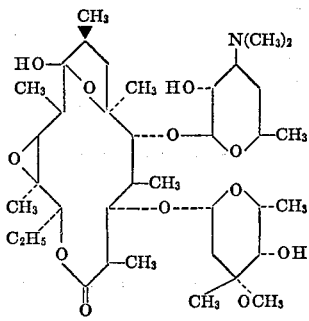

8-epi-11,12-Epoxyerythromycin A 6,9-hemiacetal

A solution prepared from 2.2 g. of 11,12-epoxyerythromycin A, and 26 ml. of glacial acetic acid was stirred at room temperature for 1 hour. The resulting solution was added dropwise to a magnetically stirred suspension of 50 g. of solid $NaHCO_3$ and 300 ml. of water. The product, 1.92 g. of white glass, was isolated by chloroform extraction as described in Example 1. Partition column chromatography of 2.0 g. of product prepared as described above gave 1.2 g. of pure 8-epi-11,12-epoxyerythromycin A 6,9-hemiacetal, as a white glass, $[\alpha]_D^{26}$ —68°; IR: 3600–3550, 3510–3430; 1727 cm.$^{-1}$; NMR, $\delta$ 3.35 (OCH$_3$), 2.72 (J$_{10,11}$=10.0 Hz. C$_{11}$-H), 2.29 (NMe$_2$), 1.58 (C$_6$-CH$_3$).

*Analysis.*: Calcd. for C$_{37}$H$_{63}$O$_{11}$N (percent): 62.08; H, 9.15; N, 1.96. Found (percent): C, 61.95; H, 9.27; N, 1.90.

EXAMPLE 3

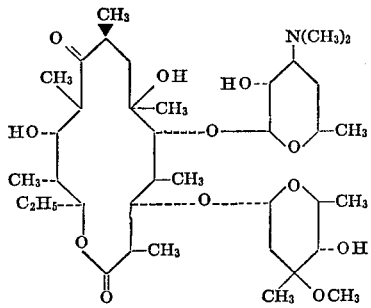

8-epi-Erythromycin B

A solution prepared from 1.0 g. of erythromycin B, 17 ml. of glacial acetic acid, and 17 ml. of water was allowed to stand at room temperature for 96 hours. The product was isolated as a white foam (719 mg.) by the method described in Example 1. Partition chromatography of this product gave 145 mg. of pure 8-epi-erythromycin B. [α]$_D^{24}$ —95°; IR: 3602, 3560–3440, 1710 cm.$^{-1}$ (Et$_3$N); NMR:δ 3.28 (OCH$_3$); 2.30 (NMe$_2$), 1.44 (C$_6$-CH$_3$).

*Analysis:* Calcd. for C$_{37}$H$_{67}$O$_{12}$ N (percent): C, 61.90; H, 9.40; N, 1.95. Found (percent): C, 61.80; H, 9.65; N, 1.94.

EXAMPLE 4

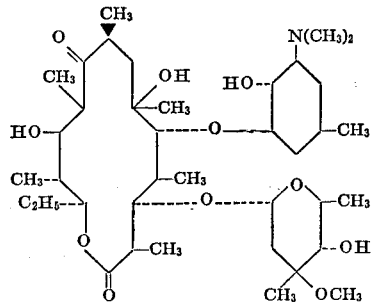

8-epi-10,11-Anhydroerythromycin A

A mixture prepared from 6.0 g. of crude 10,11-anhydroerythromycin A, 3.9 g. of 1,5 diazabicyclo[5.4.0] undecene-5 and 0.51 ml. of methanesulfonic anhydride was heated under reflux for 96 hours. The product, 4.8 g. of orange glass, was isolated by benzene extraction. Partition column chromatography of 3.0 g. of this material gave 384 mg. of pure 8-epi-10,11-anhydroerythromycin A, [α]$_D^{26}$ —59°, λ$_{max}$. 231 nm. (ε8801); IR: 3604, 3550–3400, 1728, 1664 cm.$^{-1}$; NMR: δ6.45 (C$_{11}$-H), 3.28 (OCH$_3$), 2.28 (NMe$_2$), 2.08 (C$_{10}$-CH$_3$).

*Analysis:* Calcd. for C$_{37}$H$_{65}$O$_{12}$N (percent): C, 62.08; H, 9.15; N, 1.96. Found (percent): C, 62.15; H, 9.34; N, 1.89.

EXAMPLE 5

8-epi-10,11-Anhydroerythromycin A

A solution prepared from 387 mg. of 8-epi-11,12-epoxyerythromycin A 6,9-hemiacetal, prepared by the method of Example 2, 243 mg. of 1,5-diazabicyclo[5.4.0]undecene-5, 3.2 ml. of benzene, and 0.03 ml. of methanesulfonic acid was heated under reflux for 3 hours. The product was isolated by benzene extraction to yield 308 mg. of 8-epi-10,11-anhydroerythromycin A, identical with that prepared as described in Example 4.

EXAMPLE 6

8-epi-11,12-Epoxyerythromycin A 6,9-hemiacetal

A solution prepared from 1.2 g. of 11,12-epoxyerythromycin A, 20 ml. of glacial acetic acid, and 20 ml. of water was allowed to stand at room temperature for 24 hours. The product was isolated to yield 1.1 g. of 8-epi-11,12-epoxyerythromycin A 6,9-hemiacetal identical with that prepared by the method of Example 2.

The compounds were then tested for their activity against gram positive and gram negative bacteria in an agar dilution test. Results are given in agar dilution units. These may be converted to MIC values (minimum inhibitory concentrations) expressed in micrograms/ml. by merely dividing the agar dilution units into the concentration and multiplying by the proper factor. Thus, for example, if one tested a sample at a concentration of 4 mg./ml., and determined it had an activity of 10 agar dilution units, in order to determine the MIC value in micrograms/ml. one must divide the concentration of 4 by the number of agar dilution units, here 10, and multiply by 1000.

The compounds here were tested as to their activity against the following organisms:

ECR$_3$=Multiple drug resistant *Escherichia coli*
SF=*Streptococcus faecalis* ATCC 10541
PA=*Pseudomonas aeruginosa* BMH #1,
SA=*Staphylococcus aureus* ATCC 6438P
EC=*Escherichia coli* ATCC 26
BS=*Bacillus subtilis* #10707 (University of Ill.)
PV=*Proteus vulgaris* ATCC 6897
SS=*Shigella sonnei* ATCC 9290
ST=*Salmonella typhosa* ATCC 9992
KP=*Klebsiella pneumoniae* ATCC 10031

Results are as follows:

TABLE I

| | ECR$_3$ | SF | PA | SA | EC | BS | PV | SS | ST | KP |
|---|---|---|---|---|---|---|---|---|---|---|
| Example I, 3.0 mg./ml | 0 | {1,280 / ----} | 0 | {320 / 640} | 0 | {640 / 1,280} | 0 | →  | | 40 / 80 |

TABLE II

| | ECR$_3$ | SF | PA | SA | EC | BS | PV | SS | ST | KP |
|---|---|---|---|---|---|---|---|---|---|---|
| Example II, 1 mg./ml | 0 | {10 / ----} | 0 | → | | {0 / 10} | 0 | → | | {10 / ----} |

TABLE III

| | ECR$_3$ | SF | PA | SA | EC | BS | PV | SS | ST | KP |
|---|---|---|---|---|---|---|---|---|---|---|
| Example III, 1 mg./ml | 0 | {160 / 320} | 0 | {160 / 320} | 0 | {320 / 640} | 0 | → | | {10 / 20} |

TABLE IV

| | ECR$_3$ | SF | PA | SA | EC | BS | PV | SS | ST | KP |
|---|---|---|---|---|---|---|---|---|---|---|
| Example IV, 1 mg./ml | {10 / 20} | {1,280 / ----} | 0 | {1,280 / ----} | 0 | {640 / 1,280} | 0 | → | | {80 / 160} |

TABLE V

| Organism | Erythromycin base | Ex. 1 | Ex. 2 | Ex. 3 |
|---|---|---|---|---|
| Staphylococcus aureus 9144 | 0.2 | >100 | 12.5 | 12.5 |
| Staphylococcus aureus Smith | 0.2 | >100 | 12.5 | 12.5 |
| Staphylococcus aureus Smith ER | 100 | >100 | >100 | >100 |
| Staphylococcus aureus Wise 155 | 100 | >100 | >100 | >100 |
| Streptococcus faecalis 10541 | 0.05 | 25 | 1.56 | 0.78 |
| Escherichia coli Jun 1 | 50 | >100 | [1] >100 | [2] >100 |
| Klebsiella pneumoniae 10031 | 3.1 | 25 | 25 | 12.5 |
| Proteus vulgaris Abbott JJ | 100 | >100 | [1] >100 | [2] >100 |
| Proteus mirabilis Finland No. 9 | 100 | >100 | [1] >100 | [2] >100 |
| Salmonella typhimurium Ed No. 9 | 25 | >100 | [1] >100 | [2] >100 |
| Shigella sonnei 9290 | 12 | >100 | >100 | 100 |
| Pseudomonas aeruginosa BMH No. 10 | 50 | >100 | [1] >100 | [2] >100 |
| Streptococcus pyogenes Roper | | >100 | >100 | >100 |
| Staphylococcus aureus Quinoes | 100 | >100 | >100 | >100 |
| Streptococcus pyogenes RO | 100 | >100 | | |
| Streptococcus pyogenes Scott | 100 | 1 | >100 | >100 |
| Mycobacterium gallisepticum S6 | 0.2 | 100 | | 1.0 |
| Mycobacterium granularum 19168 | .5 | >100 | | 1.0 |
| Mycobacterium hyorhinis 17981 | 25 | 2.5 | >100 | >100 |
| Mycobacterium pneumoniae FH | 0.2 | >100 | | 0.5 |
| Haemophilus influenzae Patterson | 1.56 | 100 | >100 | >100 |
| Haemophilus influenzae Brimm CSF | 0.78 | 100 | >100 | 50 |
| Haemophilus influenzae Shemwell | 1.56 | >100 | >100 | 25 |
| Haemophilus influenzae Illinois | 3.1 | >100 | >100 | 50 |
| Haemophilus influenzae Terry | 1.56 | >100 | >100 | 25 |
| Crithidia fasciculata | 100 | >100 | >100 | >100 |
| Trichomonas vaginalis CLML | 100 | >100 | >100 | >100 |
| Haemophilus influenzae 9334 | 3.1 | 100 | >100 | 100 |

[1] >1,000.  [2] 1,000.

What is claimed is:

1. An erythromycin derivative selected from the group consisting of 8-epi-10,11-anhydroethythromycin B, 8-epi-11,12-epoxyerythromycin A 6,9-hemiacetal, 8-epi-erythromycin B and 8-epi-10,11-anhydroerythromycin A.

2. The derivative of claim 1 which is 8-epi-10,11-anhydroerythromycin B.

3. The derivative of claim 1 which is 8-epi-11,12-epoxy-erythromycin A 6,9-hemiacetal.

4. The derivative of claim 1 which is 8-epi-10,11-anhydroethythromycin A.

References Cited

UNITED STATES PATENTS

| | | | |
|---|---|---|---|
| 3,598,805 | 8/1971 | Jones | 260—210 E |
| 3,674,773 | 7/1972 | Kurath | 260—210 E |
| 3,681,323 | 8/1972 | Kurath et al. | 260—210 E |

JOHNNIE R. BROWN, Primary Examiner

C. B. OWENS, Assistant Examiner

U.S. Cl. X.R.

424—180